Sept. 2, 1969          F. E. DAHLEM ET AL          3,464,563
                       LIQUID FILTER APPARATUS
Filed Feb. 6, 1967                                 2 Sheets-Sheet 1

INVENTORS
Francis E. Dahlem
Don J. Gonzalez

Ralph B. Quick
ATTORNEY

Sept. 2, 1969   F. E. DAHLEM ET AL   3,464,563
LIQUID FILTER APPARATUS

Filed Feb. 6, 1967   2 Sheets-Sheet 2

INVENTORS
Francis E. Dahlem
Don J. Gonzalez

Ralph B. Brick
ATTORNEY

United States Patent Office 3,464,563
Patented Sept. 2, 1969

3,464,563
LIQUID FILTER APPARATUS
Francis E. Dahlem, Louisville, and Don J. Gonzalez, Valley Station, Ky., assignors to American Air Filter Company, Inc., Louisville, Ky., a corporation of Delaware
Filed Feb. 6, 1967, Ser. No. 614,167
Int. Cl. B01d 33/04
U.S. Cl. 210—400
7 Claims

ABSTRACT OF THE DISCLOSURE

A liquid filter assembly disposable in a liquid tank comprising an endless filter screen mounted on a conveyor belt means disposed in a sealed liquid plenum, the endless filter screen being provided with an overlap expansion arrangement to permit expansion of the filter screen with expansion of the conveyor belt means.

Background of the invention

The present invention relates to a liquid filter of the type which employs an endless filter screen, at least a portion of which is disposed below the liquid level of a tank containing contaminant liquid to be treated. In past liquid filter arrangements of this type, filter screens of a continuous endless nature have been employed. However, such screens have had a tendency to break with wear and with expansion of the conveyor belt on which they have been mounted. Furthermore, conveyor belts utilized in past arrangements have been exposed to the contaminant liquids to be treated so as to cause an acceleration of belt wear. Although the mounting of sectional filter screens on endless conveyor belts has been broadly known in the art, such sections in the past have been mounted for the most part in edge-to-edge relationship without allowance for expansion and with the sections necessarily being of short breadth along the line of belt travel to permit passage of the belt from one flight to the other. In some instances, although the sections of the filter belt have overlapped, either the belts have been fastened firmly at both leading and trailing edges in the direction of belt movement or have been pivotally fastened along only one of such edges with the other edge dragging in the lower flight stage of the belt during operations so that the sections are susceptible to frictional wear.

Summary of the invention

The present invention provides a liquid filter assembly which recognizes and avoids the aforementioned disadvantages associated with previous liquid filter assemblies of the endless belt type, the present invention providing a liquid filter assembly which seals the conveyor belt for the filter screen from contaminant liquids being treated and which permits the filter screen to expand with wear of the conveyor belt on which it is mounted. In addition, the present invention provides an arrangement which is straightforward and economical in construction, operation and maintenance, which permits usage with a wide range of filter screen medias and a wide range of section lengths and which provides effective support of the filter screen sections along the entire length of the belt. Further, the construction of the present invention permits for ready inspection and allows movement of the overall assembly from one liquid tank to another. Various other features of the present invention will become obvious to one skilled in the art upon reading the disclosure set forth hereinafter.

More particularly, the present invention provides a liquid filter assembly for removing contaminant particulates from liquids in a liquid tank; comprising longitudinally extending spaced opposed wall members adapted to be suspendable at least partially below the liquid level in the liquid tank; opposed conveyor belt means mounted on each of the wall members in endless loop fashions; drive means connected to the conveyor belt means to drive the same; a plurality of spaced screen support members mounted to the opposed conveyor belt means; filter screen means including leading edge, body and trailing edge portions mounted in loop fashion about the spaced screen support members with the leading edge portion of the filter screen means being fastened to one of the support members, the body portion resting in free fashion on successive support members, and the trailing edge portion overlapping an immediately successive leading edge portion to permit expansion of the filter screen means with any expansion in the conveyor belt means; a plurality of spaced restraining members mounted to the opposed conveyor belt means to restrain the free portions of the filter screen means from falling off the support members during filtering operation; sealing means extending between the side edges of the filter screen means and adjacent the wall members to provide a clean liquid plenum determined by the loop filter screen means, the sealing means and the opposed wall members; and clean liquid take-off means communicating with the clean liquid plenum. In addition, the present invention provides a unique arrangement wherein the conveyor belt means is sealed within the clean liquid plenum by a novel positioning of the sealing means and the conveyor belt means.

It is to be understood that various changes can be made in the arrangement, form and construction of the apparatus disclosed herein without departing from the scope or spirit of the present invention.

Brief description of the drawings

Referring to the drawings which disclose one advantageous embodiment of the present invention;

Referring to FIGURE 1 of the drawings, the novel liquid filter assembly 2 is shown disposed in liquid filter tank 3, the walls of tank 3 being contoured to include a liquid treating section 4 and a contaminant removal section 6. Contaminant removal section 6 is provided with a contaminant outlet conduit 7 to which contaminant particulates separated by endless sceen filter 8 of filter assembly 2 are passed. Filter assembly 2 is suspended from tank 3 by means of suitable cross bars 9 and vertical suspension beams 11. The bars 9 are arranged to extend transversely across the open top of tank 3 and the suspension beams are each fastened at one end to the bars 9 and at the other end by means of suitable structural members 12 to one of the spaced opposed side wall members 14 of filter assembly 2.

Figure 1:
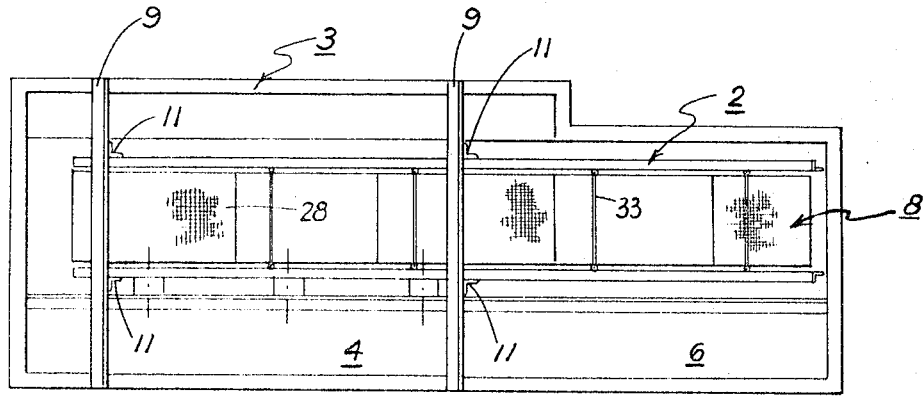
FIGURE 1 is a schematic top plan view of the novel liquid filter assembly of the present invention incorporated in a liquid tank adapted to receive contaminant liquids to be treated.

Side wall members 14 of filter assembly 2 are arranged to be spaced from the side walls of tank 3 and above the bottom floor of such tank. The side walls 14 are contoured in accordance with the contour of the tank so that one portion of assembly 2 extends into the treating section 4 of the tank 3 to be below a preselected liquid level of the tank during filter treating operations, and the other portion extends into the contaminant removal section 6 of the tank with the end extremity adjacent and above contaminant outlet 7.

Figure 2:
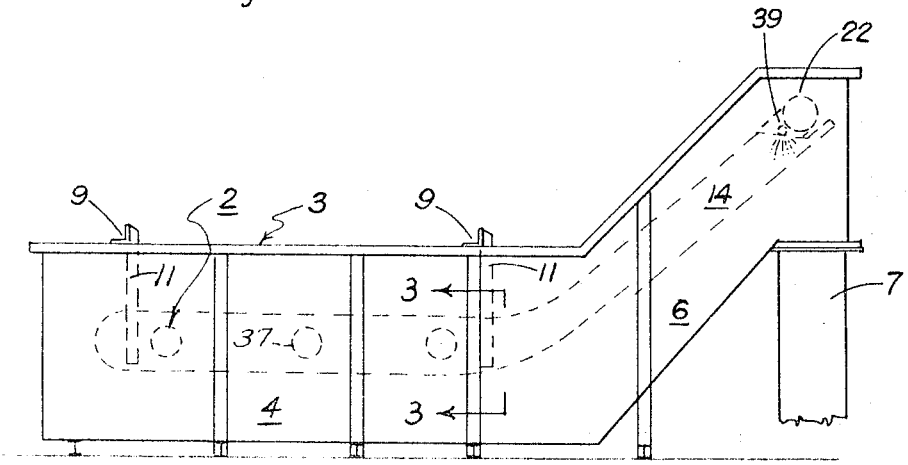
FIGURE 2 is a side elevational view of the apparatus of FIGURE 1.
Figure 4:
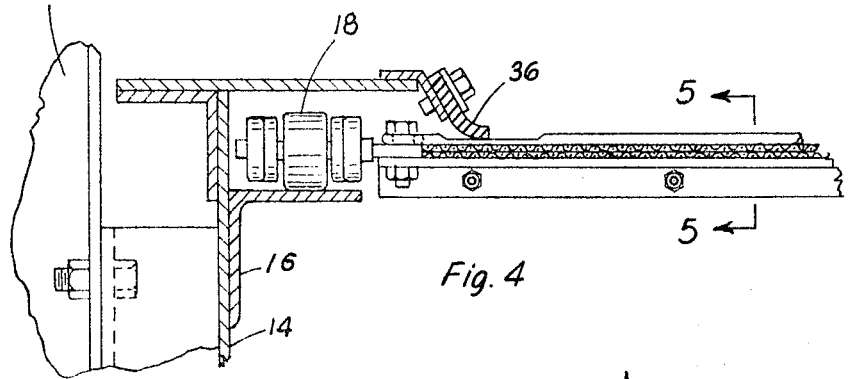
FIGURE 4 is an enlarged cross-sectional view of a portion of the apparatus of FIGURE 3, disclosing in detail the sealing arrangement for the endless filter screen.
Figure 5:
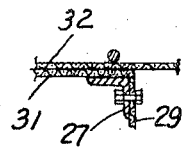
FIGURE 5 is a cross-sectional view taken in a plane passing through line 5—5 of FIGURE 4; and, FIGURE 6 is an enlarged top plan view of a portion of the apparatus of FIGURE 4 disclosing the details of the overlapping filter screen arrangement and the hold-down device utilized.
Figure 6:
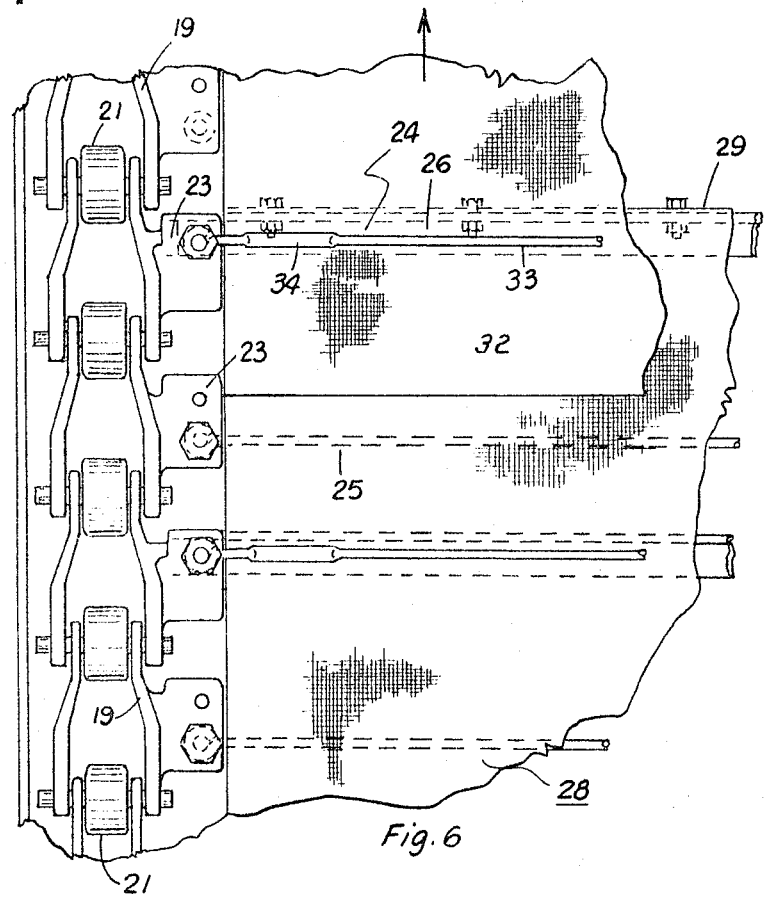

Provided along the inner facing of each of spaced walls 14 (FIGURE 4) by means of appropriately positioned and contoured right angle structural members 16 fastened to such inner wall face, are looped guide channels 17. The looped guide channels 17 which include upper and lower flights connected by end turn-around sections, serve to accommodate opposed spaced conveyor belts 18. Each conveyor belt 18 is comprised of a series of connected link members 19, the link members in turn being provided with rollers 21 which ride in looped guide channels 17 (FIGURES 4 and 6). As can be seen in FIGURE 2 of the drawings, a suitable sprocketed shaft 22 connected to a drive motor (not shown) can engage with the links of the spaced conveyor belts 18 to move them in an endless path about the looped guide channels 17. Each of links 19 is provided with an inwardly directed shelf member 23 along the inner side thereof. Referring to FIGURES 4 and 6 of the drawing it can be seen that a plurality of spaced right angle bars 24 are arranged to transversely extend between the side wall members 14 with the opposite ends thereof mounted to opposed shelf members 23 of opposed links by suitable nut and bolt arrangements as disclosed in the advantageous embodiment of the drawings. It is to be noted that right angle bars 24 are provided between every other pair of opposed links 19. A plurality of rods 25 are alternately arranged with the right angle bars 24 with their opposite ends connected in similar fashion by suitable nut and bolt arrangements to opposed shelf members 23 of alternate opposed link pairs. It is to be understood that, if desired, right angle bars 24 can be disposed between each of the successive pairs of link members—or in some other preselected arrangement in alternation with the support rods 25—all in accordance with the dimensions of the overall assembly and the weight of the screens to be supported. It will be noted that each of right angle bars 24 is provided with a face leg 26 which lies in the planes of travel of the conveyor belt and an inturned leg 27 which extends normal to face leg 26 (FIGURE 5).

The filter screen 8 advantageously is made up of a plurality of successive flexible filter screen sections 28 which are mounted in looped fashion about the spaced right angle bars 24 and rods 25. Each of filter screen sections 28 includes a leading edge portion 29, a body portion 31 and a trailing edge portion 32, with the leading edge portion of each screen 28 being turned at right angles to fasten to an inturned leg 27 of one of the right angle bars 24 (FIGURE 5) by means of a suitable fastening arrangement—such as nut and bolts or rivets. The body portions 31 of each of screen sections 28 rests freely on successive face legs 26 of successive bars 24 and alternately rods 25 with the trailing edge portions of the screens being arranged to overlap with the leading edge portions 29 of immediately successive screen section (FIGURES 5 and 6) to permit relative movement of the filter screen sections 28 with expansion of the conveyor belt 18. It is to be understood that, if the filter screen is of short length, only one flat section need be used, such section being arranged in a loop with the opposed ends thereof in overlapping fashion and the leading edge only fastened to a bar 24. It is further to be understood that the length of the sections can vary in accordance with the weight of the mesh and the overall weight and length of the filter belt needed—the particular extent of overlap, of course, being sufficient to accommodate the anticipated wear of the belt. To restrain the filter screen sections 28 so as to keep the free portions 31 and 32 of the filter sections from falling off the support members as the endless conveyor belt turns about the end of the guide channels 17 as it passes from an upper flight to a lower flight, and vice versa, a plurality of spaced restraining rods 33 are provided. These rods 33 extend transversely between side wall members 14 in co-extensive fashion with right angle bars 24 so as to be immediately above the right angle bars in spaced relationship therewith with the opposite ends of the rods mounted to the opposed conveyor belt means in similar fashion as the bars so as to restrain the free portions of the filter screens. It is to be noted that the bars 33 are provided with flat sections 34 at the opposite ends thereof, these flat sections 34 being engaged by the edges of sealing strip members 36 to minimize the amount of leakage.

As can be seen in FIGURE 4 of the drawings, sealing strips 36 extend along the outer faces of the filter screen sections 28 between the outer side edges thereof and the projected inlet faces of adjacent wall members to provide a sealed clean liquid plenum determined by the loop filter screen sections 28, the sealing strips 36 and the opposed wall members 14. Thus, the opposed conveyor belt means 18 are disposed within a clean liquid plenum so that the belts are free from contaminants to extend the life of these conveyor belts.

Figure 3:
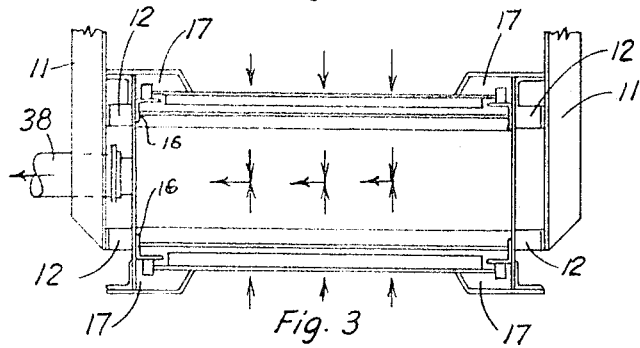
FIGURE 3 is a cross-sectional view taken in a plane passing through line 3—3 of FIGURE 2 disclosing the liquid filter assembly suspended in a liquid tank.

Referring to FIGURES 2 and 3 of the drawings it can be seen that suitable clean liquid outlets 37 communicate with the clean liquid plenum, clean liquid conduits 38 being provided to carry off the clean liquid for suitable use elsewhere.

From the aforegoing description it can be seen that the present invention provides a liquid filter assembly of the endless belt type which allows for expansion of the filter screen with wear of the conveyor belts and which maintains such conveyor belts in a clean liquid plenum so as to increase the overall life of the belts and the overall operating life of the assembly.

Finally, it will be noted that in order to enhance the cleaning of contaminants from the filter screen 8, a suitable spray conduit 39 is provided above the lower flight of the filter screen adjacent the contaminant outlet 7 of the liquid filter assembly.

The invention claimed is:

1. A liquid filter assembly for removing contaminant particulates from liquids in a liquid tank; comprising longitudinally extending spaced opposed wall members adapted to be suspended at least partially below the liquid level in said liquid tank; opposed conveyor belt means mounted on each of said wall members in endless loop fashion; drive means connected to said conveyor belt means to drive the same; a plurality of spaced screen support members mounted to said opposed conveyor belt means; flexible filter screen means including leading edge, body and trailing edge portions mounted in looped fashion about said spaced screen support members with said leading edge portion of said filter screen means being fastened to one of said support members, the body portion resting in free fashion on successive support members, and the trailing edge portion overlapping an immediately successive leading edge portion to permit expansion of said filter screen means with expansion of said conveyor belt means; a plurality of spaced restraining members mounted to said opposed conveyor belt means to restrain said free portions of said filter screen means from falling off said support members; sealing means extending between the side edges of said filter screen means and adjacent wall members to provide a clean liquid plenum determined by said looped filter screen means, said sealing means and said opposed wall members; and clean liquid take-off means communicating with said clean liquid plenum.

2. The apparatus of claim 1, said spaced screen support members comprising right angle bars transversely extending between said wall members with the opposite ends thereof mounted to said opposed conveyor belt means, each of said bars having a face leg lying substantially in the plane of travel of said conveyor belt means and an inturned leg member normal to said face leg with the leading edges of said filter screen means being turned at right angles to fasten to said inturned leg of one of said spaced bars and the body portion of said screen resting freely on successive face legs of said transversely extending spaced bars.

3. The apparatus of claim 1, said spaced restraining members comprising rods transversely extending between said wall members immediately above said support members in spaced relation therewith with the opposite ends thereof mounted to said opposed conveyor belt means, said rods having flat portions at opposite ends thereof which are engaged by said sealing means.

4. The apparatus of claim 1, said spaced opposed wall members being provided along their inner faces with looped guide channels to receive and support said opposed conveyor belt means, said sealing means being disposed to seal said guide channels and conveyor belts in said clean liquid plenum.

5. The apparatus of claim 1, said filter screen means comprising a plurality of successive sections, each including a leading edge portion fastened to a support member, a body portion resting in free fashion on successive support members and a trailing edge portion overlapping a leading edge portion of an immediately successive section.

6. A liquid filter assembly for removing contaminant particulate from liquids in a liquid tank; comprising longitudinally extending spaced opposed wall members adapted to be suspended at least partially below the liquid level in said liquid tank; opposed conveyor belt means mounted on the inner faces of said wall members in endless looped fashion; drive means connected to said conveyor belt means to drive the same; screen support means mounted to said opposed conveyor belt means; flexible filter screen means mounted between said opposed conveyor belt means in looped fashion on said screen support means; opposed sealing means extending along the outer face of said filter screen means between the side edges thereof and the inner faces of adjacent wall members to provide a sealed clean liquid plenum determined by said looped filter screen means, said sealing means and said opposed wall members with the opposed conveyor belt means disposed within said clean liquid plenum; and, clean liquid conduit take-off means communicating with said clean liquid plenum.

7. A liquid filter assembly for removing contaminant particulate from liquid in a liquid tank; comprising longitudinally extending opposed wall members adapted to be suspended at least partially below the liquid level in said liquid tank, said wall members having looped guide channels along the inner faces thereof; opposed link type conveyor belt means mounted in said looped guide channels; sprocket drive means connected to said conveyor belt means to drive the same; a plurality of spaced right angle bars transversely extending between said opposed wall members with the opposite ends thereof mounted to said opposed conveyor belt means, each of said right angle bars having a face leg lying substantially in the plane of travel of said conveyor belt and an inturned leg transverse said face leg; a plurality of successive flexible filter screen sections mounted in looped fashion about said spaced right angle bars, each of said filter screen sections including leading edge, body and trailing edge portions with the leading edge portion turned at right angles to fasten to an inturned leg of one of said right angle bars, the body portion resting freely on successive face legs of successive bars and the trailing edge portion overlapping the leading edge portion of an immediately successive screen section to permit relative movement of said filter screen sections with expansion of said conveyor belt means; a plurality of spaced rods transversely extending between said wall members immediately above said right angle bars in spaced relation therewith with opposite ends thereof mounted to said opposed conveyor belt means to restrain said free portions of said filter screen means from falling off said support members; opposed sealing strips extending along the outer faces of said filter screen means between the side edges thereof and the inner faces of adjacent wall members to provide a sealed clean liquid plenum determined by said looped filter screen means, said sealing strips and said opposed wall members with the opposed conveyor belt means disposed within said clean liquid plenum; and, clean liquid conduit take-off means communicating with said clean liquid plenum.

References Cited

UNITED STATES PATENTS

| | | | |
|---|---|---|---|
| 967,424 | 8/1910 | O'Toole | 198—109 X |
| 3,197,030 | 7/1965 | Black | 210—400 |
| 3,288,296 | 11/1966 | Hirs | 210—400 X |

REUBEN FRIEDMAN, Primary Examiner

T. A. GRANGER, Assistant Examiner